Feb. 16, 1960
W. M. OSBORN
2,925,579
NON-CORRODIBLE BATTERY TERMINAL CONNECTOR
Filed Aug. 4, 1958
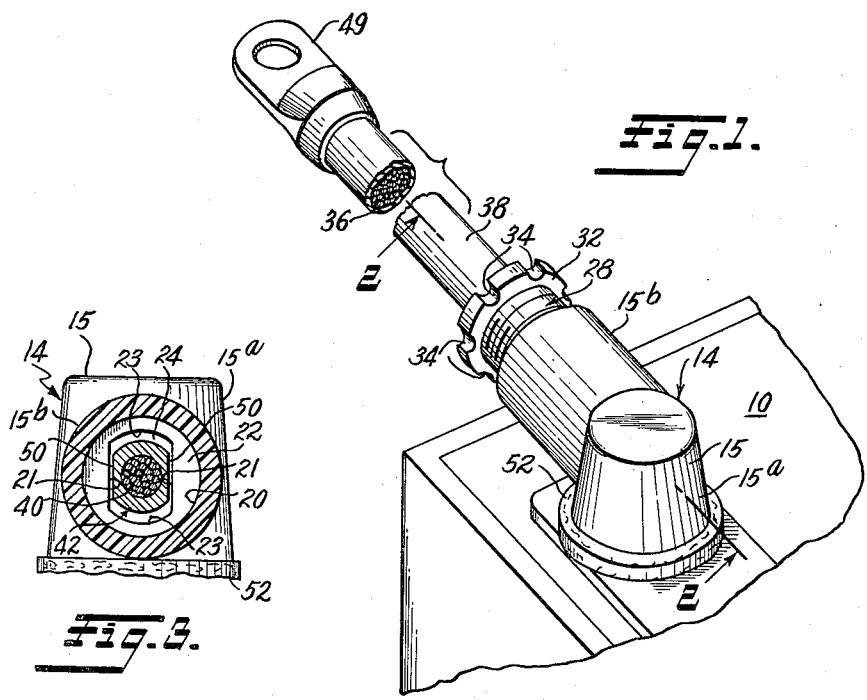
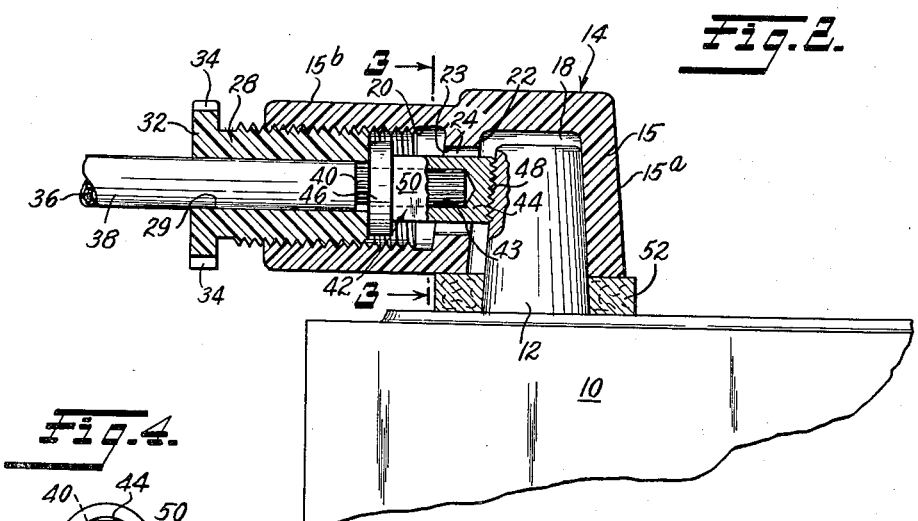
INVENTOR.
William M. Osborn
BY
Bacon & Thomas
ATTORNEYS

United States Patent Office 2,925,579
Patented Feb. 16, 1960

2,925,579

NON-CORRODIBLE BATTERY TERMINAL CONNECTOR

William M. Osborn, Denver, Colo.

Application August 4, 1958, Serial No. 752,732

1 Claim. (Cl. 339—225)

This invention relates to an electrical terminal connector and more particularly to a terminal connector for connecting a cable to a battery. More specifically, the invention relates to a non-corrodible battery terminal connector for securing a cable to a terminal post of a lead plate type of storage battery.

It is well known that connecting elements secured to the end of battery cables and attached to a terminal of a lead plate storage battery are subject to the corrosive action of gases which discharge from the cells of the battery. The corrosive action is often severe enough to cause objectionable deposits and to eat away a portion of the terminal connector and/or the connector bolt, with the result that the connection often becomes loose and a poor electrical contact results between the battery terminal and the connector.

The present invention comprises a non-corrodible battery connector designed so that it will shield and prevent the portion of the cable and battery terminal that are in contact from being damaged by the corrosive action of the escaping gases.

In general, the connector comprises a molded housing of electrically non-conductive material, in which a pair of bores are provided. The axes of the bores preferably lie in the same plane and intersect at approximately a 90° angle. The bores are separated by a partition in which a noncircular opening is provided to non-rotatably receive a terminal post gripper having a noncircular cross section corresponding to the configuration of the opening. The gripper is attached to one end of a cable or conductor, which extends through the other bore. The housing is adapted to be mounted with one bore thereof surrounding a terminal post, and to be hermetically sealed from the battery by a sealing means mounted on said post concentric with the bore. A threaded sleeve surrounds the cable in the other bore and engages the gripper in a manner such that when the sleeve is screwed tight into the bore, the inner end of the gripper is forced into contact with the terminal post. The noncircular gripper, in cooperation with the noncircular opening in the partition prevents the cable from rotating with the sleeve. The sleeve forms a gas-tight seal with the gripper and a close fit is provided between the sleeve and cable, which, in combination with the sealing means mentioned above, assures a hermetic sealing of the parts within the housing.

Accordingly, the principal object of the invention is to provide a terminal connector which will hermetically seal a contact embodied therein and a terminal post with which it is associated, against damage by corrosion.

A more specific object is to provide a terminal connector for a storage battery or the like in which the parts in electrical contact are hermetically sealed against damage by corrosive gases.

Another object is to provide a battery terminal connector in which a contact member, attached to the end of a cable or conductor, is maintained in tight physical contact with the battery terminal post and in turn secures the connector to said post.

Still another object is to provide a terminal connector comprising housing elements that can be readily molded from electrically non-conducting plastic or other material.

Still another object is to provide a terminal connector that can be made of transparent, non-conducting, plastic material and thus enable visual inspection of the terminal connection and also prevent shorting of the battery which might otherwise occur through accidental contact by a tool or other metallic element with the battery terminal.

The foregoing and other objects will become apparent from the following description taken in conjunction with the accompanying drawings, in which:

Fig. 1 is a fragmentary perspective view showing a battery cable terminal connector embodying the principles of the present invention mounted upon a terminal post of a storage battery;

Fig. 2 is an enlarged fragmentary vertical sectional view taken on the line 2—2 of Fig. 1;

Fig. 3 is a similar view taken along the line 3—3 of Fig. 2; and

Fig. 4 is an end view of a gripper that is attached to the end of the cable, and particularly illustrating the teeth or serrations formed in the end face of said gripper.

Referring to Figs. 1 and 2, there is shown at 10 a storage battery of the type conventionally used in automobiles. Such batteries are provided with a positive and a negative terminal post, only one of which is shown at 12. Such posts are usually made of lead, or a lead alloy and are tapered, as shown in Fig. 2. It is to be understood that the present terminal connector can be used with either or both the positive and negative terminal posts of the battery.

The connector is generally designated by the numeral 14 and comprises a housing 15 preferably molded from a suitable electrically non-conducting, hard rubber, or transparent plastic material, such as, for example, polymerized methyl methacrylate (more commonly known as "Lucite" and "Plexiglas"). In fact, any suitable heat and acid resistant plastic material may be used in molding the housing. The housing 15 comprises a truncated conical portion 15a and an elongated cylindrical portion 15b. The conical portion 15a has a conical bore or recess 18 and the cylindrical portion 15b has a threaded bore 20. The recess or bore 18 is located adjacent one end of the housing 15, extends transversely thereof, is of tapered form, as shown, with its larger diameter adjacent the outer face of the housing, and is generally complemental in shape to the battery terminal post 12, so that the bore has a loose fit about the terminal post. On the other hand, the bore 20 extends axially of the cylindrical portion of the housing 15b and the inner end thereof is separated from the recess 18 by a partition 22. The partition 22 has a non-circular opening 24, as shown in Fig. 3 as generally elliptical, or in the form of an elongated slot having parallel straight sides 21 and arcuate ends 23. The partition also serves to reinforce the housing at the junction of the bores 18 and 20 at the point where breakage is most likely to occur.

An externally threaded sleeve 28 is adapted to be mounted in the bore 20. A smooth passage 29 extends completely through the sleeve 28 for a purpose which will appear hereinafter. A flange 32 at the outer end of the sleeve 28 has a plurality of circumferentially spaced notches 34 adapted to be engaged by a spanner wrench, to enable the sleeve to be threaded in or out of the bore 20. The sleeve 28 is preferably made of the same non-conducting material as the housing 15.

The passage 29 receives a multi-strand electrical conductor or cable 36 covered with insulation 38, the outer surface of which has a close fit with the inner surface of the passage 29. The insulation 38 is stripped from one end of the cable 36 to leave an exposed cable end 40, as shown in Fig. 2. A gripper 42 is made to fit over the exposed end 40 of the cable 36. The gripper itself comprises tubular portion 44, having a socket 43 to receive the bare end of the cable 36. A radially extending flange 46 is formed at one end of the gripper and the face of the gripper remote from the flange is provided with a series of teeth or serrations 48.

The housing 15 and the sleeve 28 can readily be made of the desired shape by conventional pressure molding machines. These parts are preferably made of transparent plastic material so that the terminal post 12 and the gripper 44 are visible therethrough. Thus, the housing makes it possible to ascertain that the gripper is in proper engagement with the terminal 12 and to also ascertain the condition of the connection. The housing 15 completely encloses the terminal post 12, so that accidental shorting of the battery is prevented.

The connector may be assembled as follows: One end of the cable 36 is extended through the passage 29 in the sleeve 32. A short length of the insulating material 38 is removed from said end of the cable, and this may be done either before or after it has been passed through the sleeve 28. In any event, the exposed cable end 40 is preferably of only sufficient length to extend into the socket 43 in the gripper 42, so that insulating material extends along the cable throughout substantially that portion of its length which is disposed within the sleeve 28. The socket 43 in the gripper 42 is preferably circular in cross section and of a diameter substantially equal to that of the bare cable end 40. The stripped end 40 of the cable 36 is then inserted into the socket 43 in the gripper 42, after which opposite sides of the gripper are squeezed and flattened, as shown at 50 in Figs. 3 and 4, by a press or other tool, thereby permanently clamping the gripper 42 to the end of the cable. In this connection, the gripper is preferably made of lead, lead alloy, copper, brass, aluminum, or other suitable material that can be readily deformed and caused to positively grip the wire of the cable upon being squeezed.

The purpose of connecting the gripper to the cable in the manner above described is two-fold: (1) to provide a permanent connection between the gripper 42 and the cable 36, and (2) to deform the end of the gripper 42 to a non-circular shape corresponding generally in form and dimensions to that of the opening 24 in the partition 22, for a purpose to be explained hereinafter.

Obviously, the gripper 42 can be pre-assembled with the cable 36 and the cable passed through the sleeve 28 before a contact, such as the contact 49, is attached to the cable.

After the gripper 42 has been attached to the cable 36, the gripper is inserted into the housing 15 through bore 20 so that the gripper extends through the opening 24 into the bore 18. The sleeve 28 is then threaded into the bore 20 until the inner end of said sleeve engages the flange 46 at the adjacent end of the gripper 42. The opening 24 in partition 22 may be made of any desired configuration, the important feature being that the end of the gripper 42, which passes therethrough shall be of a corresponding configuration, or that the respective configurations of the opening and the gripper be of such relation that the gripper cannot rotate in the opening 24 as the sleeve 28 is threaded into the bore 20.

The assembled connector and cable can be readily attached to the battery terminal 12 in the following manner:

A washer 52 made of rubber or any other suitable material is placed around the base of the terminal post 12 and the housing 15 is then positioned over the post so that the post is received in the bore 18. The housing 15 is pressed toward the battery 10 so that it makes a tight seal with the washer 52. With the parts held in such position, sleeve 28 is further threaded into the bore 20. As soon as the inner end of the sleeve 28 engages the flange 46 on the gripper, the gripper is forced inwardly toward the terminal post 12 as the sleeve 28 is threaded farther into the housing 15. The result is that the serrations 48 are caused to bite into the post 12 to form a positive contact therewith and to also retain the housing 15 on the terminal 12. The sleeve 28 may be tightened to any degree desired by placing a spanner wrench in engagement with the notches 34. The non-circular configuration of the opening 24 and gripper 42 prevents rotation of the gripper as the sleeve 28 is drawn up tightly in the bore 20.

The inner end of the sleeve 28 will engage the flange 46 with considerable pressure and thus form a seal that will prevent corrosive gases gaining access to the gripper 42 through the bore 20. On the other hand, the sealing ring 52 will prevent corrosive gases from gaining access to the gripper 42 through the bore 18, so that the gripper and terminal post 12 are both shielded from such gases. It will also be noted that the snug fit of the insulation 38 with the passage 29 will also serve to prevent corrosive gases from gaining access to the portion of the gripper not engaged by the end of the sleeve 28. Thus, a complete hermetic seal is provided around the connection between the conductor 36 and the terminal post 12.

It will be further understood that the housing 15, sleeve 28 and gripper 42 may be sold either as a kit for replacement of the corroded conventional battery terminal, or that these parts may be pre-assembled with a battery cable and sold as a combination.

While the terminal connector has been illustrated and described herein as a battery terminal connector, it is to be understood that the connector is not limited to use with a battery, but can be used for general purposes wherever it is desired to protect terminal contacts against corrosion from any source. For example, the connector can obviously be used with outdoor transformers, high voltage line connections, etc. It will also be clear that the axis of the bores 18 and 20 may be arranged at an angle other than 90°.

It will be understood that various changes may be made in the proportions and details of construction of the terminal connector disclosed herein without departing from the principles of the invention or the scope of the annexed claim.

I claim:

A battery terminal connector, comprising; a housing having a pair of bores disposed therein at substantially right angles to each other, one of said bores being adapted to be disposed about a terminal post of a battery, the other bore being internally threaded at its outer end; an externally threaded sleeve mounted in said other bore; a partition in said housing disposed in a plane transverse to said other bore and separating said bores, said partition having a non-circular opening extending therethrough of smaller size than said other bore, said opening being defined, in part, by at least one generally flat wall surface; an insulated conductor extending through said externally threaded sleeve and having a bare inner end portion; and a gripper mounted on said bare inner end portion of said conductor, said gripper extending through said partition and comprising a sleeve having projections at its inner end adapted to bite into said terminal post to form a positive connection therewith, said gripper having an initially circular recess snugly receiving said bare inner end of said conductor therein, said gripper having a portion thereof flattened to distort said circular recess and clamp the gripper to said conductor and to provide a substantially flat exterior side surface corresponding generally to the configuration of the flat wall surface of the non-circular opening in said partition and cooperating therewith to prevent rotation of the gripper in the partition opening, said gripper further having an abutment flange at its outer end received in said other bore, the inner end of said threaded sleeve engaging said flange for applying axial force thereto to secure said gripper to said terminal post.

References Cited in the file of this patent

UNITED STATES PATENTS

| | | |
|---|---|---|
| 1,969,051 | Thompson | Aug. 7, 1934 |
| 2,357,567 | Williams | Sept. 5, 1944 |
| 2,466,930 | Cook | Apr. 12, 1949 |
| 2,657,370 | Hobson | Oct. 27, 1953 |
| 2,844,806 | McKissick | July 22, 1958 |